June 23, 1964 C. W. MATHESON ETAL 3,138,242
GRAIN CONVEYOR
Filed Feb. 16, 1960 3 Sheets-Sheet 1
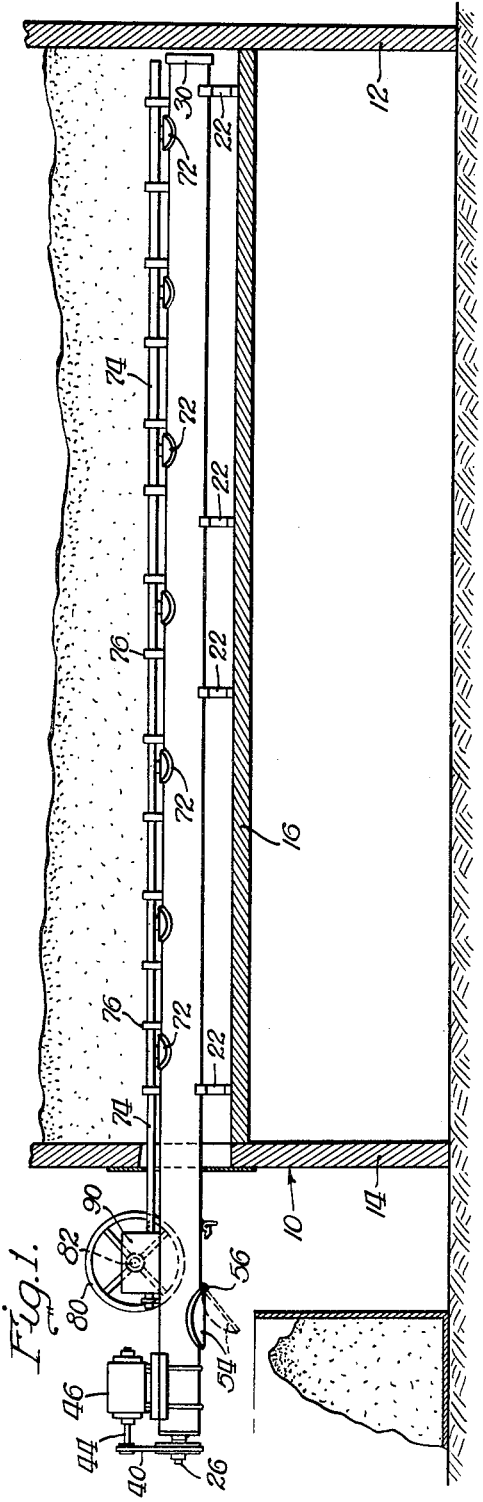
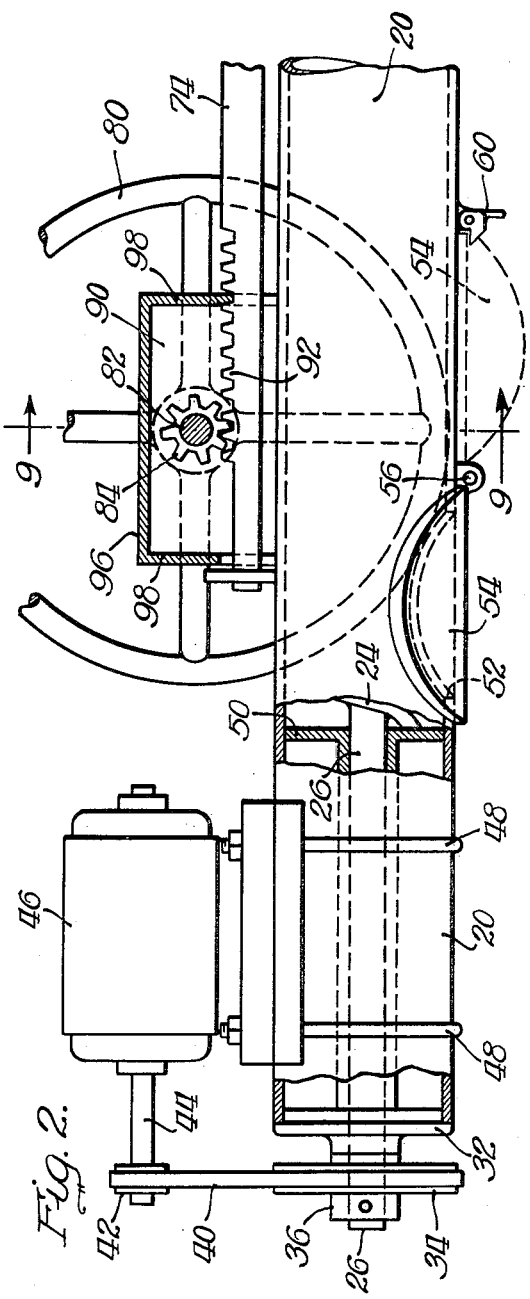
INVENTORS:
Carl W. Matheson
Sylvia N. Matheson
BY
Eberhard E. Wedey
Atty.

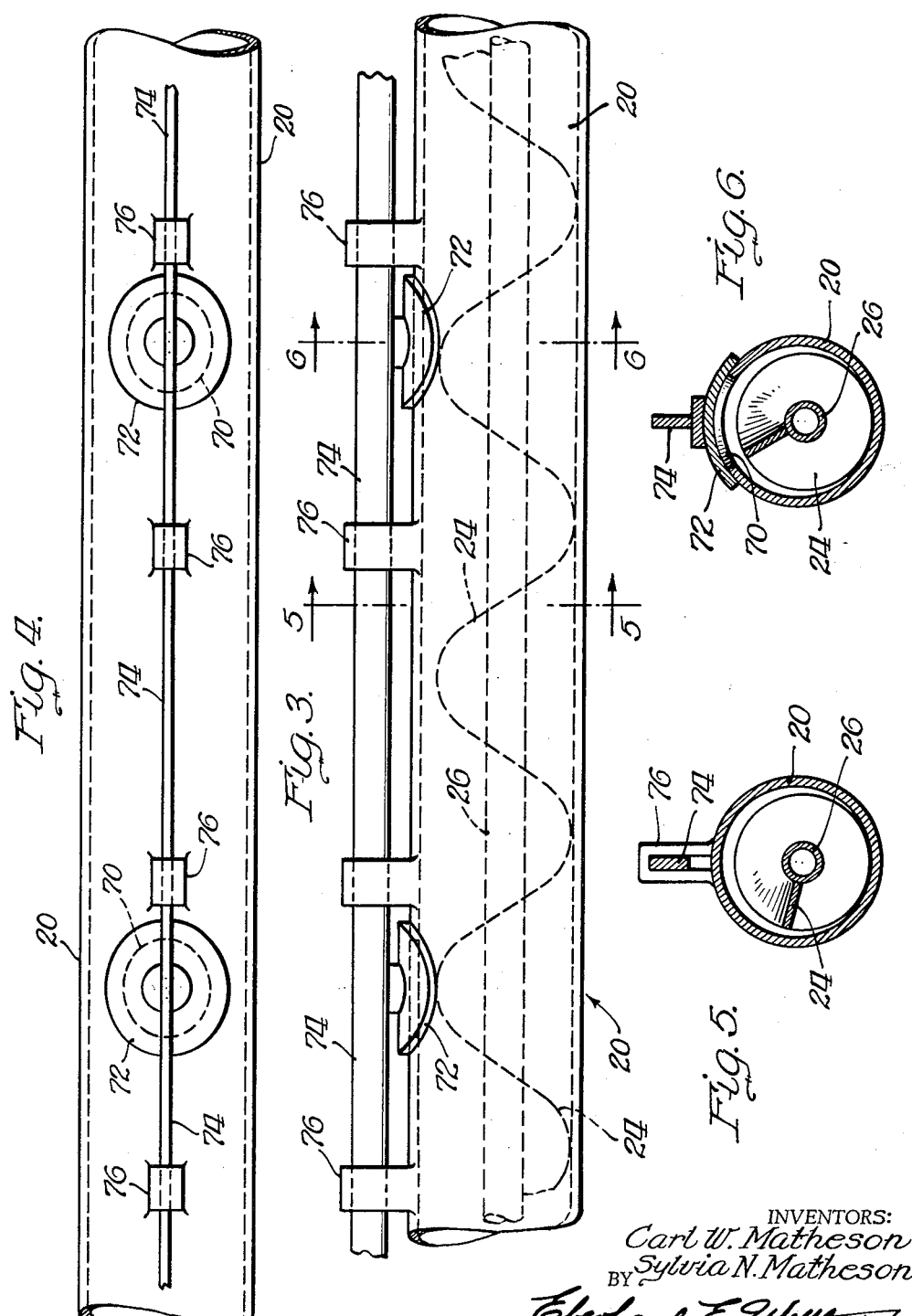

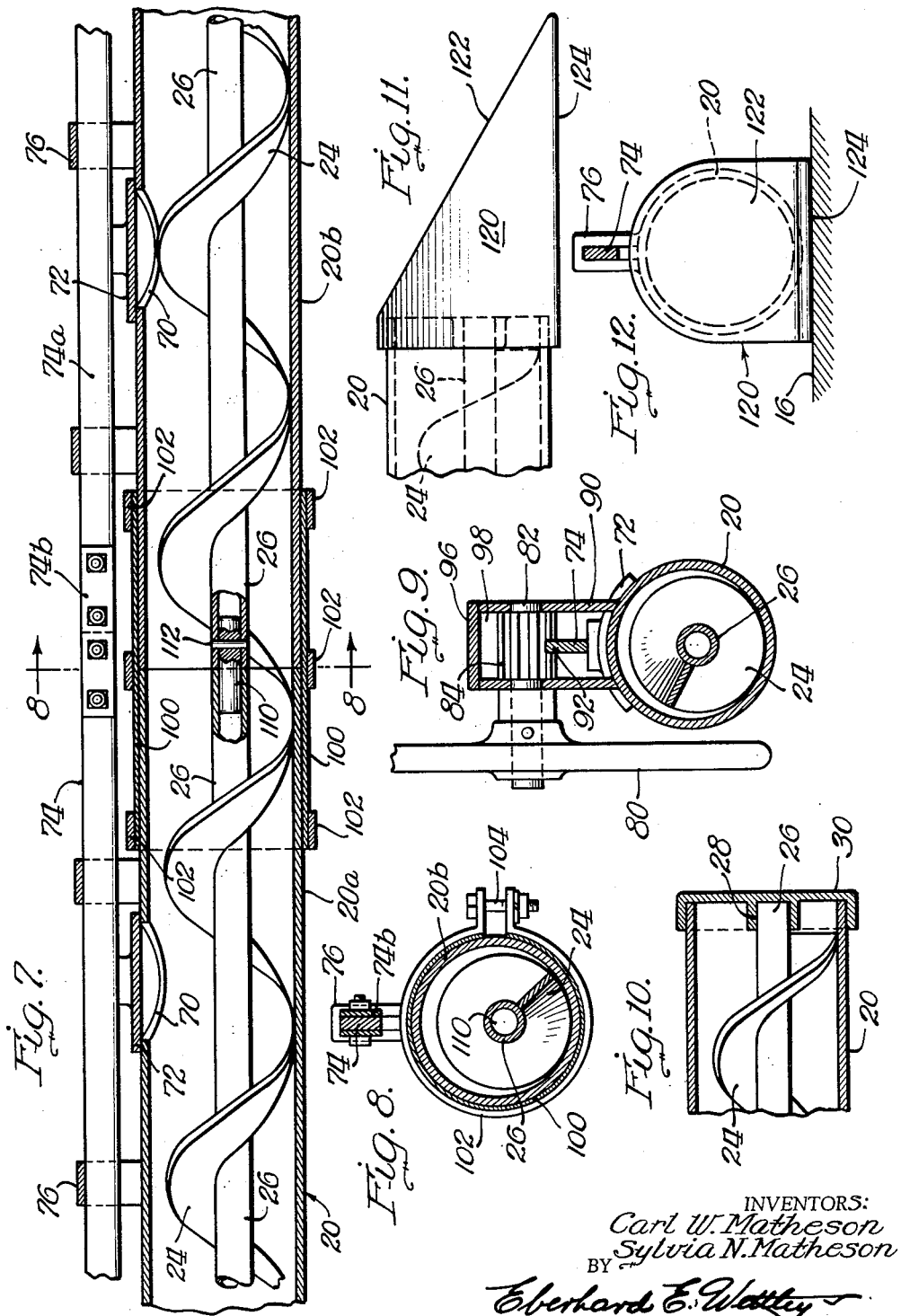

United States Patent Office 3,138,242
Patented June 23, 1964

3,138,242
GRAIN CONVEYOR
Carl W. Matheson and Sylvia N. Matheson, both of R.R. 2, Neponset, Ill.
Filed Feb. 16, 1960, Ser. No. 9,120
4 Claims. (Cl. 198—213)

Our invention relates to granule conveyors.

Our invention relates more particularly to a screw conveyor of the type described adapted particularly to moving bulk grain granules, such as wheat, oats, rye, and shelled or ground corn.

Conveyors of this type are especially useful to stock or poultry raising farmers in supplying grain from a granary or storage bin, the conveyor being adapted to be positioned close to the floor or lower surface of the bin or granary and having spaced inlets throughout its length, so that ordinarily the supply of grain can be removed evenly throughout the length of the conveyor, causing the level of the grain to drop evenly throughout the length of the granary.

The principal object of our invention is to provide an improved type of screw conveyor for granules.

A further object of the invention is to provide a conveyor of the type described that is portable and capable of being moved from place to place.

A further object of the invention is to provide a screw conveyor of the type described having a plurality of inlet openings throughout its length and a common discharge at one end and a single control for regulating the size of all the inlet openings at once.

A further object of the invention is to provide a motor driven conveyor of the type described which is comparably light and portable so that one or two persons may carry the same about and may introduce the same into a loaded or filled bin of grain by introducing the conveyor into the bottom of the same, the conveyor having a pointed end so that it may be easily pushed forward in proper operating position along the floor of the granary.

A further object of the invention is to provide in a conveyor of the type described, a unique and easily operable control member for opening the plurality of inlet ports that are positioned along the top of the same, causing each one to be gradually opened to the exact amount as the other, the control means being located at the forward end of the conveyor adjacent the motor drive, so that a single operator may start and stop the same and also control the rate of flow through the same.

Other objects and advantages will be more apparent from the following description wherein reference is had to the accompanying drawings, upon which, FIG. 1 is a side elevational view of the grain conveyor operatively positioned through a granary or storage bin showing the improved conveyor resting upon the floor of the bin and beneath grain that is in the granary;

FIG. 2 is a fragmentary side elevation of the forward end of the conveyor where the discharge opening, drive and port control mechanism are located, with parts broken away and in section to more clearly show other parts;

FIG. 3 is a fragmentary side elevational view of the conveyor pipe and control mechanism for operating the individual valve means for the inlet ports;

FIG. 4 is a plan view of the conveyor portion shown in FIG. 3;

FIG. 5 is a transverse cross-sectional view taken substantially along the plane of the line 5—5 in FIG. 3;

FIG. 6 is a cross-sectional view through one of the valve means at one of the inlet ports taken substantially along the plane of the line 6—6 in FIG. 3;

FIG. 7 is a longitudinal sectional view through the conveyor at meeting portions of two joined conveyor pipes and their respective conveyor screws showing the manner in which these units are connected together;

FIG. 8 is a transverse cross-sectional view through the connected conveyor sections and associated parts, taken generally on the line 8—8 of FIG. 7;

FIG. 9 is a cross-sectional view through the control mechanism for operating the inlet ports and as taken generally along the plane of the line 9—9 of FIG. 2;

FIG. 10 is a fragmentary longitudinally sectional view of the closed end of the conveyor;

FIG. 11 is a fragmentary side elevational view of a modified form of closure or end structure for the conveyor; and FIG. 12 is an end view of the closure means of FIG. 11.

In the embodiment of the invention which has been chosen to illustrate and describe the same, FIGS. 1 and 2, depict a grain conveyor in connection with a granary 10, which may have the back wall 12, front wall 14, and floor 16. The grain conveyor, which comprises an elongated tubular duct or housing 20 oriented and positioned by means of suitable support brackets 22 located at desired intervals throughout the length of the tubular housing 20, with the brackets loosely and freely supported or resting upon the floor 16 forming the bin bottom.

In the construction shown in FIG. 1, the brackets will hold the conveyor 20 slightly above the floor level, but in another form of the invention, which will be hereinafter described, the brackets may be dispensed with and the housing supported directly upon the floor itself. The housing 20 may be a cylindrical tubular housing, as shown, and have a screw or spiral conveyor 24 mounted therein with the shaft 26 of the spiral conveyor mounted at the back end in a bore 28 of an end cap 30, and the front end mounted in a front cap 32 and extending outwardly therefrom to receive a pulley 34 which has a hub 36 keyed to the shaft 26. The pulley 34 may be driven by a belt 40 from a smaller pulley 42 mounted on the end of a motor shaft 44 that extends from a motor 46.

The motor 46 is mounted on the duct or housing 20 adjacent the front end of the same by means of a pair of U-shaped bolts 48. The forward end of the housing 20 may also have a vertical baffle 50 just beyond the discharge opening 52 and the latter may normally be closed by a cover plate 54. The cover plate 54 is carried upon a pivot 56 supported by a bracket from the housing 20, and to open the outlet port completely, the cover 54 may be swung through an arc of 180°, as shown in dotted lines, and be held up by a suitable spring pressed latch member 60.

The tubular duct or housing 20 of the conveyor may be provided with a plurality of equally spaced inlet ports 70 located throughout its length, each of the ports 70 having an individual valve means such as a cover plate 72 for closing the individual ports. All of the cover plates or valves 72 are fastened to a common control rod or actuation bar 74 which may extend generally throughout the length of the housing 20, being held in the vertical position shown by the rod or bar guides 76, oppositely spaced with respect to the individual inlet ports along the length of the housing and in line with inlet port 70, the cover plates being guided upon the upper arcuate portion of the housing. The control rod is actuated adjacent the front end of the machine by means of a hand wheel 80 which is keyed to a stub shaft 82 upon which a pinion gear 84 is mounted.

The pinion gear 84 is located in a box-like member 90 fastened on top of the housing near the front end of the same, the pinion 84 meshing with a rack 92 provided on one end of the control rod 74, so that rotation of the hand wheel in a clockwise direction will close the inlet ports, and rotation in a counterclockwise direction will open the same. The box-like member 90 is generally U-shaped as shown, having a movable cover plate 96 with two depending vertical walls 98, one slightly longer than the other, so that when the cover plate is set in position on the housing 90, as shown in FIG. 2, the lower edge of the longer wall 98 engages between two of the teeth of the rack 92 and locks the control rod 74 against movement. Thus the cover plate 96 acts not only as a cover for the box-like member 90, but also as a locking member which must be raised to permit movement of the control bar 74 to regulate the multiple value means.

When it is desired to provide a longer conveyor, two ends of a pair of housings 20a and 20b may be fastened together by means of a split sleeve member 100 which has a plurality of strap members 102 on the same that may be fastened together by bolts 104. The ends of the shafts 26 of the spiral conveyor may be connected together in end-to-end relation by a rod 110 which is fastened in one end of one of the tubular shafts 26 and extends into the adjacent shaft end to align the same, and a pin 112 connects one shaft 26 and the rod 110 together. The control rod 74 may have an extension 74a connected thereto by means of a plate 74b which is bolted to both of the rods and holds them in end-to-end relation.

It is frequently desirable to install a conveyor in a filled bin of grain, and for this purpose a pointed end cap 120 is provided, which is connected to the back end of the housing 20 and provided with a sloped wall portion 122 and a flat horizontal bottom wall 124 so that the entire conveyor may be guided and moved inwardly into the bin of grain along the floor 16 of the granary. The sloping wall 122 may have the effect of both guiding the conveyor as it is pushed inwardly and keeping the same flat on the floor of the granary. Additionally, by reason of the flat bottom wall 124, it will hold the housing 20 and associated parts in vertical position so that the inlet openings will be at the top and the outlet will be at the bottom of the front end. With the use of this type of an end cap 120, legs 22 are omitted to facilitate endwise insertion of the housing 20, with the end cap providing the orientation means.

From the above and foregoing description it will be apparent to those skilled in the art that we have provided a comparatively light portable grain or granule conveyor which is so made that it may be conveniently and selectively positioned in a granary and the level of the grain throughout the length of the conveyor will be lowered throughout the length, and the discharged grain will all flow out of a single discharge opening near the forward end of the conveyor. The conveyor is sufficiently light so that a pair of operators may easily place the same in a grain wagon to unload grain, or may move the same from one granary or another for operation there if desired. Also, by reason of the pointed cap on the end and the flat bottom surface of the cap, the conveyor can easily be inserted into a supply of grain in a granary and the conveyor will position itself readily on the floor of the same and in an upright position so that the inlet ports are all at the top of the tubular housing and the discharge opening will be at the bottom.

It is contemplated that changes and modifications may be made in the exact details shown and that the invention should not be limited in any particular by reason of the disclosure or foregoing description; and what we desire to secure and protect by Letters Patent of the United States is:

We claim:

1. A conveyor comprising a mechanism to withdraw stored grain from the bottom portion of the interior confines of a grain bin for discharge outside of said bin through a bin wall opening comprising a tubular housing to seat upon the floor within the confines of the bin and to extend across said bin and out of said bin wall opening, a conveyor in said tubular housing to draw grain through the housing, said housing having a plurality of equal size inlet openings ranging across the bin area along the length of the housing portion disposed within said bin and a discharge opening in said housing disposed outwardly beyond the bin wall, and metering means to control the flow of grain from the full bin area into all of the housing inlet openings simultaneously comprising cover plates of equal sizes oriented alike over each of the housing inlet openings and frictionally riding upon the upper surface of the tubular housing between the grain load and the housing, an actuation bar connected with each cover plate for concerted opening and closing of the inlet openings by said plates, and a plurality of bar guides connected with said housing in predetermined longitudinal positions with respect to the housing openings to guide said bar and to permit endwise regulatory operation of said bar across said housing openings along the length of said housing, said cover plates being of arcuate shape transversely of said housing to fit the housing for longitudinal translatory guidance therealong at said housing openings, said cover plates being located between said bar guides and supporting said bar overhead in said bar guides to counteract lateral flexing of said actuation bar between adjacent bar guides during the opening or closing of said housing openings with said respective connected cover plates or under static adjusted positions of said cover plates when subjected to the grain load and grain flow.

2. A conveyor combination as in claim 1 wherein said housing openings are located at the upper surface of the tubular housing to receive descending grain from the bin, said actuation bar being flat and vertically arranged by said bar guides to provide free and uninterrupted grain flow access to the housing openings past the actuation bar when said inlet openings are uncovered by said cover plates.

3. In the combination of claim 2 with the addition of support brackets to maintain the housing in a given angular relation on its axis and with respect to the floor of said bin to position the housing openings upwardly and to maintain said actuation bar in an upright position in the bin and edgewise to the downward flow of the grain into the housing openings.

4. A conveyor comprising a mechanism to withdraw stored grain from the bottom portion of a grain bin for discharge outside of said bin through a bin wall opening comprising a tubular housing to seat upon the floor of the bin and to extend across said bin and out of said bin wall opening, a conveyor in said tubular housing to draw grain through the housing, said housing having a plurality of inlet openings along the length thereof on the portion within said bin and a discharge opening therein disposed outwardly beyond the bin wall, and metering means to control the flow of grain from the bin into the housing inlet openings comprising cover plates of equal sizes oriented alike over each of the housing inlet openings, an actuation bar connected with each cover plate for concerted opening and closing of the inlet openings by said plates, and a plurality of bar guides connected with said housing in predetermined longitudinal positions with respect to the housing openings to permit endwise regulatory operation of said bar across said housing openings along the length of said housing, said cover plates being of arcuate shape transversely of said housing to fit the housing and located between said bar guides whereby to counteract lateral flexing of said actuation bar between adjacent bar guides during the opening or closing of said housing openings with said respective connected cover plates or under static adjusted positions subjected to the grain load and grain flow, and an end cap on said tubular housing having a flat bottom portion to coincidentally engage the surface of the floor of the bin for housing stability, said cap being further provided with an upwardly exposed flat sloped wall extending from the housing top to the flat bottom, said sloped wall providing ingress means to permit endwise penetration of the bin grain by said housing upon installation of said housing through the bin wall opening, and said flat bottom of said cap providing a floor engaging means to position the tubular housing in a given angular relation with respect to its axis and with respect to the bin floor to orient the housing openings in predetermined operative relations with respect to the bin and its grain content, said flat sloped wall being subjected to the overhead grain load to further hold said bottom wall seated against the bin floor.

References Cited in the file of this patent

UNITED STATES PATENTS

| 797,100 | Crosby | Aug. 15, 1905 |
| 1,237,334 | Heisler | Aug. 21, 1917 |
| 2,055,725 | Johnson | Sept. 29, 1936 |
| 2,279,201 | Kozak | Apr. 7, 1942 |
| 2,357,220 | Olson | Aug. 29, 1944 |
| 2,378,658 | Rensch | June 19, 1945 |
| 2,793,615 | Kerkvliet | May 28, 1957 |
| 2,961,126 | Craig | Nov. 22, 1960 |